United States Patent
Katayama et al.

(10) Patent No.: US 8,834,712 B2
(45) Date of Patent: Sep. 16, 2014

(54) SEAWATER DESALINATION SYSTEM

(75) Inventors: Kyosuke Katayama, Kawasaki (JP);
Takeshi Matsushiro, Yokohama (JP);
Futoshi Kurokawa, Tachikawa (JP);
Takanori Fukagawa, Yokohama (JP);
Kazuhiko Kimijima, Musashimurayama (JP); Koichi Matsui, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 332 days.

(21) Appl. No.: 13/013,241

(22) Filed: Jan. 25, 2011

(65) Prior Publication Data
US 2011/0220561 A1 Sep. 15, 2011

(30) Foreign Application Priority Data
Mar. 12, 2010 (JP) .................................. 2010-056376

(51) Int. Cl.
| B01D 35/00 | (2006.01) |
| B01D 63/00 | (2006.01) |
| C02F 9/00 | (2006.01) |
| C02F 1/00 | (2006.01) |
| C02F 1/44 | (2006.01) |
| C02F 103/08 | (2006.01) |

(52) U.S. Cl.
CPC .............. *C02F 1/008* (2013.01); *C02F 2209/40* (2013.01); *C02F 1/441* (2013.01); *C02F 1/444* (2013.01); *C02F 2209/03* (2013.01); *C02F 2103/08* (2013.01)
USPC .... 210/87; 210/321.6; 210/195.1; 210/195.2; 210/258; 210/321.65; 210/97

(58) Field of Classification Search
None
See application file for complete search history.

(56) References Cited

U.S. PATENT DOCUMENTS

| 5,182,023 A * | 1/1993 | O'Connor et al. ............ 210/652 |
| 6,139,740 A * | 10/2000 | Oklejas ..................... 210/321.66 |
| 2004/0217041 A1* | 11/2004 | Baarman et al. .............. 210/103 |
| 2005/0029200 A1* | 2/2005 | Miller ........................... 210/743 |

FOREIGN PATENT DOCUMENTS

JP 07-284637 10/1995
(Continued)

OTHER PUBLICATIONS

Office Action received from Japan Patent Office in corresponding application 2010-056376, mailed Mar. 21, 2012.

*Primary Examiner* — Nam Nguyen
*Assistant Examiner* — Richard Gurtowski
(74) *Attorney, Agent, or Firm* — Finnegan, Henderson, Farabow, Garrett & Dunner, LLP

(57) ABSTRACT

According to one embodiment, a seawater desalination system includes a membrane filtering pump, a first to third flowmeter, a filtering membrane, a high-pressure pump, a pressure gauge, a reverse osmosis membrane, a discharge valve and a control module. The membrane filtering pump outputs seawater according to a first control signal. The first flowmeter measures flow rate Q1. The high-pressure pump outputs filtered water from the filtering membrane according to a second control signal. The first pressure gauge measures pressure P1. The reverse osmosis membrane desalinates the filtered water into fresh water. The second flowmeter measures flow rate Q2. The third flowmeter measures flow rate Q3. The discharge valve discharges a high-concentration salt water according to a third control signal. The control module performs first, second, and third flow rate control with reference to the flow rate Q1, Q2 and Q3 and the pressure P1.

9 Claims, 5 Drawing Sheets

(56) References Cited

FOREIGN PATENT DOCUMENTS

| JP | 8-206460 | 8/1996 |
|----|----------|--------|
| JP | 10-464 | 1/1998 |
| JP | 10-314734 | 12/1998 |
| JP | 2003-245666 | 9/2003 |
| JP | 2008-100219 | 5/2008 |
| JP | 2008-237971 | 10/2008 |
| JP | 2009-172462 | 8/2009 |
| WO | WO 2010/004819 | 1/2010 |

* cited by examiner

| Control | Object module | Reference value | Target value |
|---|---|---|---|
| Flow rate control 1 | Membrane filtering pump 12 | Flow rate Q1 | Q2+Q3 |
| Flow rate control 2 | High-pressure RO pump 15 | Flow rate Q2 | X1 |
| Flow rate control 3 | Discharge valve 114 | Pressure P2 | Upper limit value Pmax Lower limit value Pmin1 |
| Pressure control 1 | Control valve 16 | Pressure P1 | Lower limit value Pmin2 |

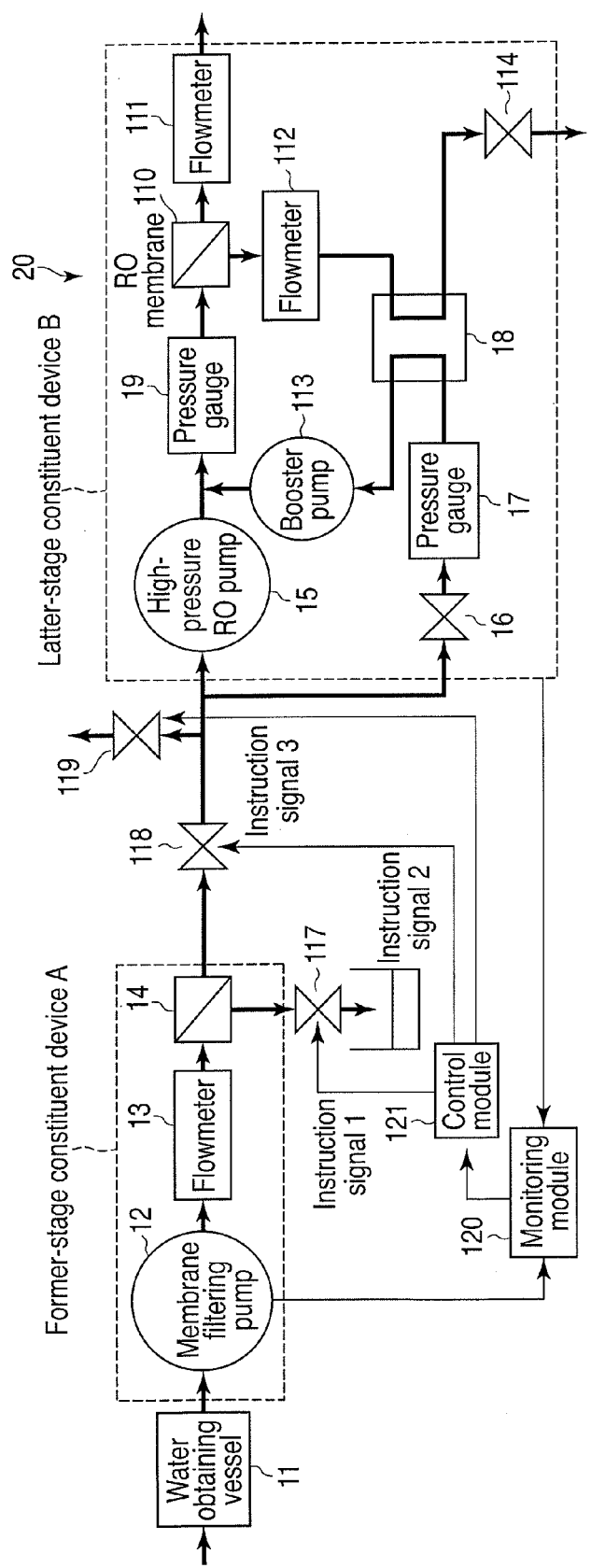
F I G. 4

|  | Shut-off valve 117 | Shut-off valve 118 | Shut-off valve 119 |
| --- | --- | --- | --- |
| Normal state | Closed | Opened | Closed |
| When latter-stage constituent device B is in trouble | Opened | Closed | Closed |
| When former-stage constituent element A is in trouble | Closed | Closed | Opened |

F I G. 5

SEAWATER DESALINATION SYSTEM

CROSS-REFERENCE TO RELATED APPLICATIONS

This application is based upon and claims the benefit of priority from Japanese Patent Application No. 2010-056376, filed Mar. 12, 2010; the entire contents of which are incorporated herein by reference.

FIELD

Embodiments described herein relate generally to a seawater desalination system.

BACKGROUND

As methods of seawater desalination, a method called "evaporation method" which obtains fresh water by distilling sea water, and a membrane method (herein referred to as "RO membrane method") which filters seawater under high pressure by using a reverse osmosis membrane (hereinafter referred to as "RO membrane") have been put to practical use. In the RO membrane method, seawater, pressure of which is increased by a high-pressure RO pump, is passed through an RO membrane, and thereby the seawater is desalinated. The RO membrane method generally requires lower desalination cost than that of the evaporation method. Therefore, the RO membrane method has come into wide use in place of the evaporation method (for example, see Jpn. Pat. Appln. KOKAI Publication No. 08-206460).

In the meantime, in seawater desalination systems using the RO membrane method, seawater is subjected to pretreatment before being desalinated through an RO membrane, to remove suspended solids in the obtained seawater. In recent years, a micro filter membrane (MF membrane) or an ultrafiltration membrane (UF membrane) is used for the pretreatment (for example, see Jpn. Pat. Appln. KOKAI Publication No. 2009-172462 and No. 2008-100219). Seawater which has been subjected to pretreatment is temporarily held in a control vessel. When a required water feed quantity to the RO membrane is increased or pretreatment quantity is reduced, the control vessel stably supplies the pretreated seawater to the high-pressure RO pump. The high-pressure RO pump increases the pressure of seawater supplied from the control vessel, and feeds the seawater to the RO membrane. In the RO membrane method, the pretreated seawater must be temporarily held in the control vessel, and thus there is the fear that suspended solids such as microorganisms and dirt may be mixed into the seawater, and the water quality may deteriorate. In addition, such a structure including the control vessel increases the size of the seawater desalination system.

BRIEF DESCRIPTION OF THE DRAWINGS

FIG. 4 is a block diagram illustrating a function and a configuration of a seawater desalination system according to a second embodiment.

FIG. 5 is a diagram illustrating control by a control module of FIG. 4.

DETAILED DESCRIPTION

In general, according to one embodiment, a seawater desalination system includes a membrane filtering pump, a first flowmeter, a filtering membrane, a high-pressure pump, a first pressure gauge, a reverse osmosis membrane, a second flowmeter, a third flowmeter, a discharge valve and a control module. The membrane filtering pump outputs seawater stored in a water obtaining vessel in accordance with a first control signal. The first control signal controls flow rate of the seawater from the membrane filtering pump. The first flowmeter measures flow rate $Q1$ of the seawater from the membrane filtering pump. The filtering membrane filters the seawater from the membrane filtering pump. The high-pressure pump outputs filtered water, that is filtered by the filtering membrane, in accordance with a second control signal. The second control signal controls flow rate of the filtered water from the high-pressure pump. The first pressure gauge measures pressure $P1$ of the filtered water from the high-pressure pump. The reverse osmosis membrane desalinates the filtered water from the high-pressure pump into fresh water. The second flowmeter measures flow rate $Q2$ of the fresh water from the reverse osmosis membrane. The third flowmeter measures flow rate $Q3$ of high-concentration salt water. The high-concentration salt water is discharged when the filtered water is desalinated in the reverse osmosis membrane. The discharge valve discharges the high-concentration salt water in accordance with a third control signal. The third control signal controls a valve opening degree of the discharge valve. The control module performs first flow rate control, second flow rate control, and third flow rate control. The first flow rate control generates the first control signal such that the flow rate $Q1$ follows the flow rate $Q2+Q3$ and supplies the first control signal to the membrane filtering pump. The second flow rate control generates the second control signal such that the flow rate $Q2$ follows a preset target value and supplies the second control signal to the high-pressure pump. The third flow rate control generates the third control signal such that the pressure $P1$ falls within a preset pressure range and supplies the third control signal to the discharge valve.

First Embodiment

Figure 1:
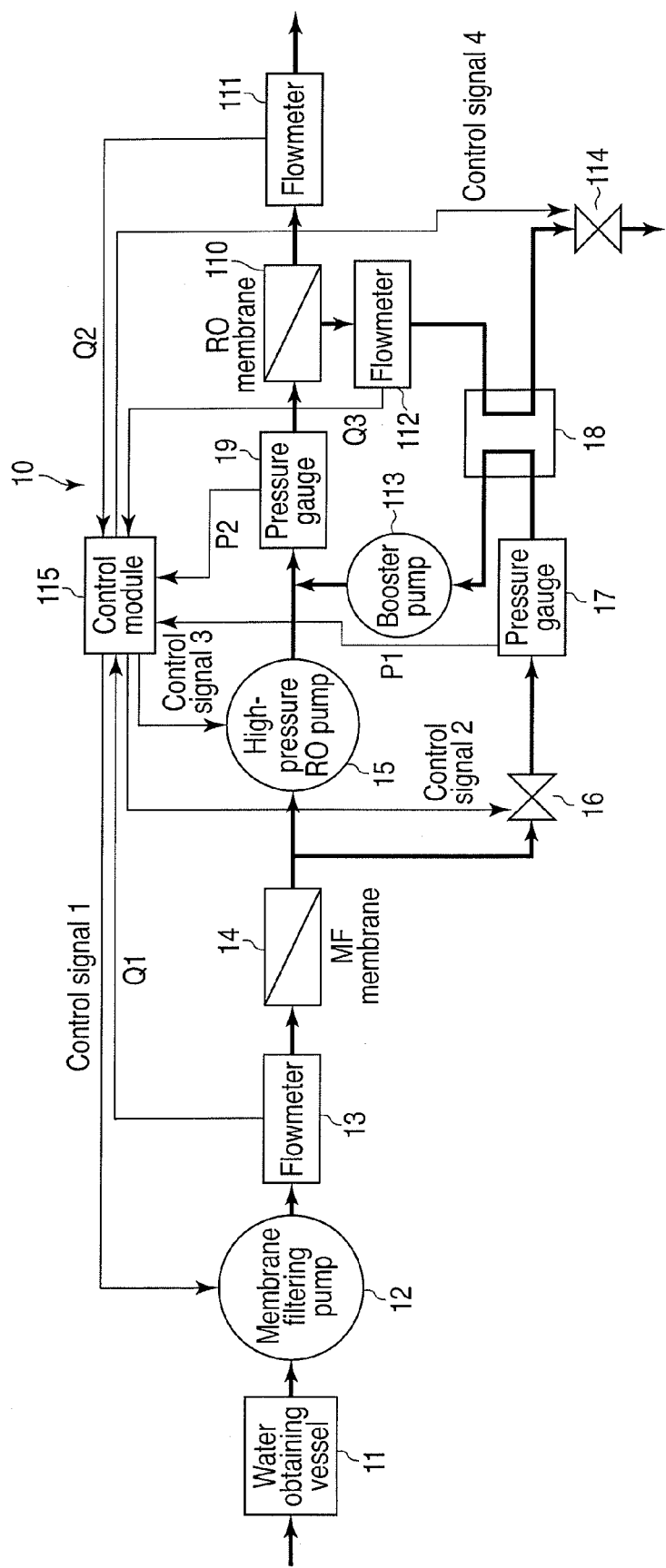
FIG. 1 is a block diagram illustrating a function and a configuration of a seawater desalination system according to a first embodiment.

FIG. 1 is a block diagram illustrating a function and a configuration of a seawater desalination system 10 according to a first embodiment. In the seawater desalination system 10 illustrated in FIG. 1, seawater is obtained into a water obtaining vessel 11.

A membrane filtering pump 12 feeds the seawater of the water obtaining vessel 11 to an MF membrane 14 through a flowmeter 13. A flow rate of the seawater which is fed from the membrane filtering pump 12 is controlled by a control signal 1 from a control module 115 described later. The flowmeter 13 measures the flow rate $Q1$ of the seawater which is to be fed to the MF membrane 14, and notifies the control module 115 of the measured flow rate $Q1$. The MF membrane 14 filters the seawater fed from the membrane filtering pump 12, and removes suspended solids in the seawater. Although an MF membrane is used in the present embodiment, the embodiment can also be performed with a UF membrane.

The seawater from the MF membrane 14 is divided into two, one is supplied to a high-pressure RO pump 15, and the other is supplied to a power recovery device 18 through a control valve 16 and a pressure gauge 17. A valve opening degree of the control value 16 is controlled by a control signal 2 from the control module 115. The pressure gauge 17 measures pressure P1 of the seawater supplied from the control valve 16, and notifies the control module 115 of the measured pressure P1.

The high-pressure RO pump 15 increases the pressure of the seawater fed from the MF membrane 14, and feeds the seawater to an RO membrane 110 through a pressure gauge 19. A flow rate of the seawater to be fed to the RO membrane 110 is controlled by a control signal 3 supplied from the control module 115. The pressure gauge 19 measures pressure P2 of the seawater fed from the high-pressure RO pump 15, and notifies the control module 115 of the measured pressure P2.

The RO membrane 110 desalinates the supplied seawater from the high-pressure RO pump 15. Fresh water obtained by the desalination is outputted to the following stage through a flowmeter 111. In addition, high-concentration salt water which is discharged from the RO membrane 110 when the fresh water is obtained is outputted to the power recovery device 18 through a flowmeter 112.

The flowmeter 111 measures flow rate Q2 of the fresh water supplied from the RO membrane 110, and notifies the control module 115 of the measured flow rate Q2. The flowmeter 112 measures flow rate Q3 of the high-concentration salt water supplied from the RO membrane 110, and outputs the measured flow rate Q3 to the control module 115.

The power recovery device 18 increases the pressure of the seawater supplied from the MF membrane 14 by using pressure energy which is included in the high-concentration salt water, and outputs the seawater to a booster pump 113. The power recovery device 18 discharges the high-concentration salt water, from which the pressure energy has been recovered, through a discharge valve 114. A valve opening degree of the discharge valve 114 is controlled by a control signal 4 from the control module 115.

The booster pump 113 increases the pressure of the seawater supplied from the power recovery device 18 to a pressure almost equal to that of the seawater supplied from the high-pressure RO pump 15. Then, the booster pump 113 makes the pressure-increased seawater join the seawater supplied from the high-pressure RO pump 15, and feeds the seawater to the RO membrane 110.

The control module 115 performs flow rate control 1 to control a quantity of seawater supplied from the membrane filtering pump 12, flow rate control 2 to control a quantity of seawater supplied from the high-pressure RO pump 15, flow rate control 3 to control a quantity of high-concentration salt water discharged from the discharge valve 114, and pressure control 1 to control the pressure of seawater to be supplied to the power recovery device 18. The control module 115 achieves these controls by using PID control or the like.

Figures 2, 3:
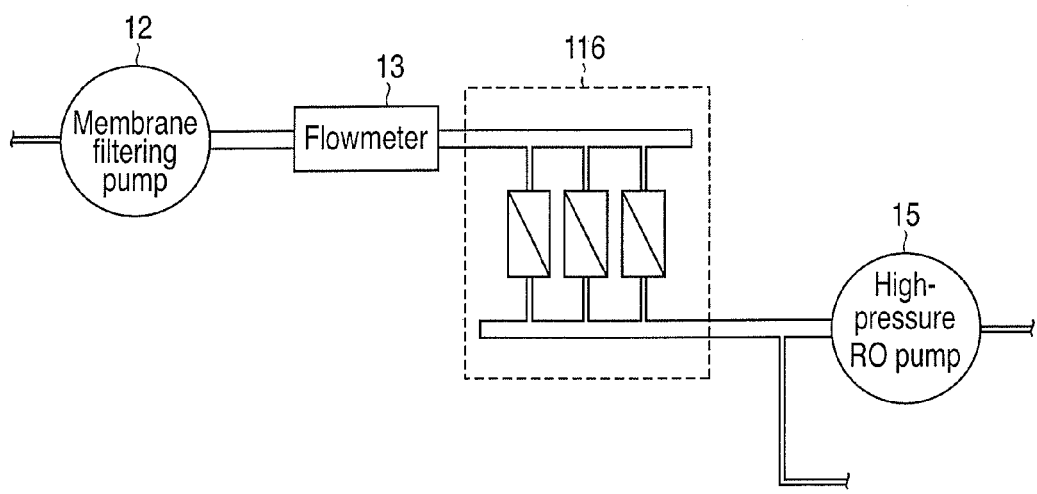
FIG. 2 is a diagram illustrating control by a control module of FIG. 1.
FIG. 3 is a diagram illustrating an example of a structure from a membrane filtering pump to a high-pressure RO pump of FIG. 1.

FIG. 2 is a diagram illustrating control by the control module 115 of the seawater desalination system 10 according to the first embodiment.

The control module 115 performs flow rate control 1, with reference to the flow rate Q1 measured by the flowmeter 13, the flow rate Q2 measured by the flowmeter 111, and the flow rate Q3 measured by the flowmeter 112. Specifically, the control module 115 uses a water feed quantity (Q2+Q3) to the RO membrane 110 as target value. In addition, the control module 115 outputs a control signal 1 to control the motor rotation number to the membrane filtering pump 12, to make the flow rate Q1 follow the water feed quantity (Q2+Q3). Thereby, it is possible to stably supply seawater of flow rate necessary for desalination by the RO membrane 110.

A desired target value X1 of the flow rate Q2 is inputted to the control module 115. The control module 115 performs flow rate control 2, with reference to the target value X1 and the flow rate Q2 measured by the flowmeter 111. Specifically, the control module 115 outputs a control signal 3 to control the motor rotation number to the high-pressure RO pump 15, to make the flow rate Q2 follow the target value X1. Thereby, it is possible to obtain fresh water of a desired quantity.

An upper limit value Pmax and a lower limit value Pmin1 of the pressure P2 are inputted to the control module 115. The upper limit value Pmax and the lower limit value Pmin1 are pressure values suitable for normally operating the RO membrane 110. The control module 115 performs flow rate control 3, with reference to the upper limit value Pmax, the lower limit value Pmin1, and the pressure P2 which is measured by the pressure gauge 19. Specifically, the control module 115 outputs a control signal 4 to control the valve opening degree to the discharge valve 114, such that the inlet pressure P2 of the RO membrane 110 falls within the range from the upper limit value Pmax to the lower limit value Pmin1. Thereby, it is possible to maintain the inlet pressure P2 of the RO membrane 110 within the range from the upper limit value to the lower limit value.

A lower limit value Pmin2 of the pressure P1 is inputted to the control module 115. The lower limit value Pmin2 is a pressure value necessary for increasing the pressure of seawater in the power recovery device 18. The control module 115 performs pressure control 1, with reference to the lower limit value Pmin2 and the pressure P1 which is measured by the pressure gauge 17. Specifically, the control module 115 outputs a control signal 2 to control the valve opening degree to the control valve 16, such that the pressure P1 does not become lower than the preset lower limit value Pmin2. For example, when the control valve 16 is opened in accordance with the control signal 2, the pipe resistance is reduced, and the input pressure P1 to the power recovery device 18 is increased. Thereby, it is possible to maintain the input pressure P1 of the power recovery device 18 at a value not lower than the lower limit value.

Next, flow rate control 2 and flow rate control 3 in the above structure will be explained hereinafter in detail.

In flow rate control 2, the measured value of the inlet pressure P2 of the RO membrane 110 is not considered, and thus there is the possibility that the inlet pressure P2 falls out of the range from the upper limit value Pmax to the lower limit value Pmin1, according to the value of the target value X1. Therefore, flow rate control 3 acts when the inlet pressure P2 falls out of the range from the upper limit value Pmax to the lower limit value Pmin1.

For example, suppose that the target value X1 which satisfies "target value X1>flow rate Q2" is inputted to the control module 115. The control module 115 outputs a control signal 3 to the high-pressure RO pump 15, and thereby increases the rotation number of the high-pressure RO pump 15, and increases the flow rate Q2 to follow the target value X1. In this state, if the inlet pressure P2 exceeds the upper limit value Pmax, the control module 115 narrows down the discharge valve 114 by outputting a control signal 4 to the discharge valve 114, and reduces the flow rate Q3 of the high-concentration salt water. By reducing the flow rate Q3, the flow rate Q2 is increased for that, and thus the flow rate Q2 exceeds the target value X1. When the flow rate Q2 exceeds the target value X1, the control module 115 outputs a control signal 3 to the high-pressure RO pump 15, and decreases the rotation number of the high-pressure RO pump 15. Thereby, the inlet pressure P2 decreases, and the value thereof falls within the range from the upper limit value Pmax to the lower limit value Pmin1.

Conversely, suppose that the target value X1 which satisfies "target value X1<flow rate Q2" is inputted to the control module 115. The control module 115 outputs a control signal 3 to the high-pressure RO pump 15, and thereby decreases the rotation number of the high-pressure RO pump 15, and reduces the flow rate Q2 to follow the target value X1. In this state, if the inlet pressure P2 becomes less than the lower limit value Pmin1, the control module 115 outputs a control signal 4 to the discharge valve 114 and thereby opens the discharge valve 114 wider, and increases the discharge quantity Q3 of the high-concentration salt water. By increasing the flow rate Q3, the flow rate Q2 is reduced for that, and the flow rate Q2 becomes smaller than the target value X1. When the flow rate Q2 becomes smaller than the target value X1, the control module 115 outputs a control signal 3 to the high-pressure RO pump 15, and increases the rotation number of the high-pressure RO pump 15. Thereby, the inlet pressure P2 is increased, and the value thereof falls within the range from the upper limit value Pmax to the lower limit value Pmin1.

As described above, according to the above first embodiment, the membrane filtering pump 12, the high-pressure RO pump 15, the control valve 16 and the discharge valve 114 are controlled based on the measurement results by the flowmeters 13, 111, and 112, and the pressure gauges 17 and 19. Thereby, it is possible for the seawater desalination system 10 to stably supply seawater required by modules in the system. Specifically, the seawater desalination system can stably supply pretreated seawater, although it has no control vessel which is required in conventional systems. In addition, since the system has no control vessel, it is possible to prevent mixing of suspended solids such as microorganisms and dirt. Besides, since the system requires no control vessel, it does not require a protect filter which removes suspended solids from seawater of the control vessel, or a water feed pump to feed seawater to the protect filter.

Therefore, according to the seawater desalination system according to the present embodiment, it is possible to stably supply seawater to the high-pressure RO pump without control vessel. In addition, it is possible to suppress deterioration in quality of pretreated water. It is also possible to reduce the installation cost and the installation space, and improve efficiency of operation and maintenance.

Although the above first embodiment has no explanation as to the diameter of the water feed pipes which feed seawater, it is possible to vary the diameters of the water feed pipes in the system. FIG. 3 is a diagram illustrating an example of a structure from the membrane filtering pump 12 to the high-pressure RO pump 15 in the seawater desalination system 10 according to the first embodiment.

In FIG. 3, the seawater desalination system 10 includes an MF membrane unit 116, which is formed by connecting a plurality of MF membranes in parallel. A water feed pipe from the membrane filtering pump 12 to the MF membrane unit 116 and a water feed pipe from the MF membrane unit 116 to the high-pressure RO pump 15 have a diameter which is larger than usual. These water feed pipes function as header pipes.

Therefore, even when water supply to any of MF membrane is intentionally stopped to wash the MF membrane in the MF membrane unit 116, it is possible to prevent abrupt change in pressure in a main pipe. In addition, even when the pressure of a branch pipe is abruptly changed due to some troubles, it is possible to prevent abrupt change in pressure in the main pipe. Further, since it is less necessary to consider change in pressure which occurs when the MF membranes are stopped or started, it is possible to easily perform maintenance of the system.

Second Embodiment

FIG. 4 is a block diagram illustrating a function and a configuration of a seawater desalination system 20 according to a second embodiment. In FIG. 4, constituent elements which are the same as those in FIG. 1 are denoted by the same respective reference numerals, and only constituent elements which are different from FIG. 1 are explained in the second embodiment. The seawater desalination system 20 in FIG. 4 further comprises shut-off valves 117 to 119, and a monitoring module 120.

The shut-off valve 117 is provided in a discharge channel of an MF membrane 14. The shut-off valve 117 opens and closes the valve, in accordance with an instruction signal 1 from a control module 121 described later.

The shut-off valve 118 is provided in a part before a diverging point to a control valve 16, in a water feed pipe from the MF membrane 14 to a high-pressure RO pump 15. The shut-off valve 118 opens and closes the valve, in accordance with an instruction signal 2 from the control module 121.

The shut-off valve 119 serves as a discharge channel which discharges seawater from the water feed pipe from the MF membrane 14 to the high-pressure RO pump 15. The shut-off valve 119 is provided in a discharge channel provided between the shut-off valve 118 and the above diverging point. The shut-off valve 119 opens and closes the valve, in accordance with an instruction signal 3 from the control module 121.

The monitoring module 120 monitors occurrence of troubles in a former-stage constituent device A including the MF membrane 14 and previous modules. The former-stage constituent device A indicates, for example, the membrane filtering pump 12 and the MF membrane 14. The monitoring module 120 also monitors occurrence of troubles in a latter-stage constituent device B including the high-pressure RO pump 15 and following modules. The latter-stage constituent device B indicates, for example, the high-pressure RO pump 15, a power recovery device 18, and an RO membrane 110, and a booster pump 113. The monitoring module 120 notifies the control module 121 of monitoring results thereof.

The control module 121 controls opening and closing of the shut-off valves 117 to 119, based on the monitoring results obtained from the monitoring module 120. FIG. 5 is a diagram illustrating control performed by the control module 121 of the seawater desalination system 20 according to the second embodiment.

When no trouble occurs in the former-stage constituent device A or the latter-stage constituent device B, that is, when the system normally operates, the control module 121 outputs an instruction signal 1 to close the shut-off valve 117, an instruction signal 2 to open the shut-off valve 118, and an instruction signal 3 to close the shut-off valve 119. Thereby, seawater from the MF membrane 14 is supplied to the high-pressure RO pump 15 and the control valve 16.

When the former-stage constituent device A normally operates and any trouble occurs in the latter-stage constituent device B, the control module 121 outputs an instruction signal 1 to open the shut-off valve 117, an instruction signal 2 to close the shut-off valve 118, and an instruction signal 3 to close the shut-off valve 119. When any trouble occurs in the latter-stage constituent device B, for example, the high-pressure RO pump 15 is stopped, water which is fed from the MF membrane 14 has no place to go, and the pressure in the pipe increases. Thereby, there is the possibility that the pipes and the devices may break. In such a state, until the membrane filtering pump 12 is stopped after any trouble occurs in the latter-stage constituent device B, the shut-off valve 117 is opened and the shut-off valves 118 and 119 are closed, and thereby seawater from the MF membrane 14 is temporarily released into the drain. This structure enables preventing the pipes and the devices from breaking.

When any trouble occurs in the former-stage constituent device A and the latter-stage constituent device B normally operates, the control module 121 outputs an instruction signal 1 to close the shut-off valve 117, an instruction signal 2 to close the shut-off valve 118, and an instruction signal 3 to open the shut-off valve 119. When any trouble occurs in the former-stage constituent device A, sufficient seawater is not supplied to the high-pressure RO pump 15, and the pipes and the devices temporarily have negative pressure, until the high-pressure RO pump 15 is stopped after the trouble occurs in the former-stage constituent device A. Thereby, there is the possibility that the pipes and the devices may break. In this state, until the high-pressure RO pump 15 is stopped after the trouble occurs in the former-stage constituent device A, the shut-off valve 119 is opened, and the shut-off valves 117 and 118 are closed, and thereby the space in the pipes is opened to the atmosphere. Then, the user of the system stops the high-pressure RO pump 15 before the high-pressure RO pump 15 sucks water remaining in the pipe. This structure enables preventing the pipes and the devices from breaking.

The control module 121 further has the function of the control module 115 of the above first embodiment.

As described above, according to the above second embodiment, the membrane filtering pump 12, the high-pressure RO pump 15, the control valve 16 and the discharge valve 114 are controlled, based on measurement results by the flowmeters 13, 111, and 112, and the pressure gauges 17 and 19, and thereby it is possible to stably supply seawater required by modules in the system. Specifically, the seawater desalination system can stably supply pretreated seawater, although it has no control vessel which is required in conventional systems. In addition, since the system has no control vessel, it is possible to prevent mixing of suspended solids such as microorganisms and dirt. Besides, since the system requires no control vessel, it does not require a protect filter which removes suspended solids from seawater of the control vessel, or a water feed pump to feed seawater to the protect filter.

In addition, according to the above second embodiment, opening/closing of the shut-off valves 117 to 119 are controlled in accordance with trouble occurrence states of the former-stage constituent device A and the latter-stage constituent device B. This structure enables preventing breakage of the pipes and the devices when any trouble occurs.

Therefore, according to the seawater desalination system according to the present embodiment, it is possible to stably supply seawater to the high-pressure RO pump without a control vessel, achieve reduction in size of the system, and suppress deterioration in water quality. In addition, even when any trouble occurs in a constituent device in the system, it is possible to protect the pipes and the devices.

Third Embodiment

Figure 6:
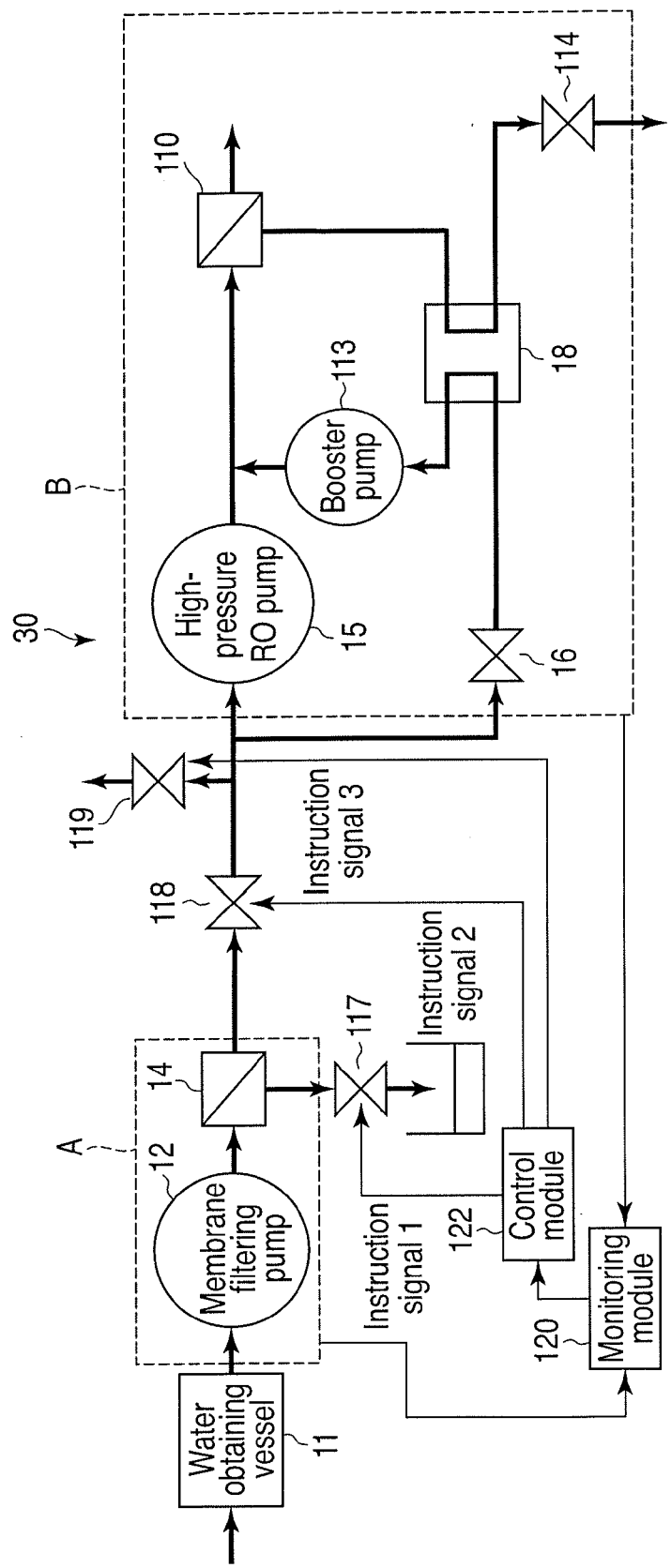
FIG. 6 is a block diagram illustrating a function and a configuration of a seawater desalination system according to a third embodiment.

FIG. 6 is a block diagram illustrating a function and a configuration of a seawater desalination system 30 according to a third embodiment. In the seawater desalination system 30 illustrated in FIG. 6, seawater is obtained into a water obtaining vessel 11.

A membrane filtering pump 12 feeds the seawater in the water obtaining vessel 11 to an MF membrane 14. The MF membrane 14 filters the seawater which is fed from the membrane filtering pump 12, and removes suspended solids in the seawater. Although an MF membrane is used in the present embodiment, the third embodiment can also be carried out with a UF membrane.

The seawater from the MF membrane 14 is divided into two, one is supplied to a high-pressure RO pump 15, and the other is supplied to a power recovery device 18 through a control valve 16. The high-pressure RO pump 15 increases pressure of the seawater from the MF membrane 14, and feeds the seawater to an RO membrane 110.

The RO membrane 110 desalinates the supplied seawater form the high-pressure RO pump 15. Fresh water which is obtained by the desalination is outputted to the following stage. High-concentration salt water which is discharged from the RO membrane 110 when fresh water is obtained is outputted to the power recovery device 18.

The power recovery device 18 increases the pressure of the seawater from the MF membrane 14, by using pressure energy included in the high-concentration salt water, and outputs the seawater to a booster pump 113. In addition, the power recovery device 18 discharges the high-concentration salt water, from which the pressure energy has been recovered, through a discharge valve 114. The booster pump 113 increases pressure of the seawater supplied from the power recovery device 18 to a pressure almost equal to that of the seawater from the high-pressure RO pump 15. Then, the booster pump 113 adds the pressure-increased seawater to the seawater from the high-pressure RO pump 15, and feeds the seawater to the RO membrane 110.

The seawater desalination system 30 further comprises shut-off valves 117 to 119.

The shut-off valve 117 is provided in a discharge channel of the MF membrane 14. The shut-off valve 117 opens and closes the valve, in accordance with an instruction signal 1 from a control module 122 described later.

The shut-off valve 118 is provided in a part before a diverging point to a control valve 16, in a water feed pipe from the MF membrane 14 to the high-pressure RO pump 15. The shut-off valve 118 opens and closes the valve, in accordance with an instruction signal 2 from the control module 122.

The shut-off valve 119 serves as a discharge channel which discharges seawater from the water feed pipe from the MF membrane 14 to the high-pressure RO pump 15. The shut-off valve 119 is provided in a discharge channel provided between the shut-off valve 118 and the above diverging point. The shut-off valve 119 opens and closes the valve, in accordance with an instruction signal 3 from the control module 122.

A monitoring module 120 monitors occurrence of troubles in a former-stage constituent device A including the MF membrane 14 and previous modules. The former-stage constituent device A indicates, for example, the membrane filtering pump 12 and the MF membrane 14. The monitoring module 120 also monitors occurrence of troubles in a latter-stage constituent device B including the high-pressure RO pump 15 and following modules. The latter-stage constituent device B indicates, for example, the high-pressure RO pump 15, the power recovery device 18, the RO membrane 110, and the booster pump 113. The monitoring module 120 notifies the control module 122 of monitoring results thereof.

The control module 122 controls opening and closing of the shut-off valves 117 to 119, based on the monitoring results obtained from the monitoring module 120. Opening/closing control performed by the control module 122 is the same as opening/closing control performed by the control module 121 and illustrated in FIG. 5 according to the second embodiment.

When no trouble occurs in the former-stage constituent device A or the latter-stage constituent device B, that is, when the system normally operates, the control module 122 outputs an instruction signal 1 to close the shut-off valve 117, an instruction signal 2 to open the shut-off valve 118, and an instruction signal 3 to close the shut-off valve 119. Thereby, filtered water from the MF membrane 14 is supplied only to the high-pressure RO pump 15 and the control valve 16.

When the former-stage constituent device A normally operates and any trouble occurs in the latter-stage constituent device B, the control module 122 outputs an instruction signal 1 to open the shut-off valve 117, an instruction signal 2 to close the shut-off valve 118, and an instruction signal 3 to close the shut-off valve 119. When any trouble occurs in the latter-stage constituent device B, for example, the high-pressure RO pump 15 is stopped, water which is fed from the MF membrane 14 has no place to go, and the pressure in the pipe increases. Thereby, there is the possibility that the pipes and the devices may break. In such a state, until the membrane filtering pump 12 is stopped after any trouble occurs in the latter-stage constituent device B, the shut-off valve 117 is opened and the shut-off valves 118 and 119 are closed, and thereby filtered water from the MF membrane 14 is temporarily released into the drain. This structure enables preventing the pipes and the devices from breaking.

When any trouble occurs in the former-stage constituent device A and the latter-stage constituent device B normally operates, the control module 122 outputs an instruction signal 1 to close the shut-off valve 117, an instruction signal 2 to close the shut-off valve 118, and an instruction signal 3 to open the shut-off valve 119. When any trouble occurs in the former-stage constituent device A, sufficient seawater is not supplied to the high-pressure RO pump 15, and the pipes and the devices temporarily have negative pressure, until the high-pressure RO pump 15 is stopped after the trouble occurs in the former-stage constituent device A. Thereby, there is the possibility that the pipes and the devices may break. In this state, until the high-pressure RO pump 15 is stopped after the trouble occurs in the former-stage constituent device A, the shut-off valve 119 is opened, and the shut-off valves 117 and 118 are closed, and thereby the space in the pipes is opened to the atmosphere. Then, the user of the system stops the high-pressure RO pump 15 before the high-pressure RO pump 15 sucks water remaining in the pipe. This structure enables preventing the pipes and the devices from breaking.

As described above, according to the above third embodiment, opening/closing of the shut-off valves 117 to 119 are controlled in accordance with trouble occurrence states of the former-stage constituent device A and the latter-stage constituent device B. This structure enables preventing breakage of the pipes and the devices when any trouble occurs.

Therefore, according to the seawater desalination system according to the present embodiment, it is possible to protect the pipes and the devices even when any trouble occurs in a constituent device in the system.

Other Embodiments

Although the above embodiments show examples in which the seawater desalination systems 10, 20 and 30 have the power recovery device 18, the embodiments are not limited to these examples. For example, the seawater desalination systems 10, 20 and 30 can be realized in the same manner without power recovery device 18.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A seawater desalination system comprising:
   a membrane filtering pump which outputs seawater stored in a water obtaining vessel in accordance with a first control signal, the first control signal controlling flow rate of the seawater from the membrane filtering pump;
   a first flowmeter which measures a first flow rate of the seawater from the membrane filtering pump;
   a filtering membrane which filters the seawater from the membrane filtering pump;
   a high-pressure pump which outputs filtered water, that is filtered by the filtering membrane, in accordance with a second control signal, the second control signal controlling flow rate of the filtered water from the high-pressure pump;
   a first pressure gauge which measures a first pressure of the filtered water from the high-pressure pump;
   a reverse osmosis membrane which desalinates the filtered water from the high-pressure pump into fresh water;
   a second flowmeter which measures a second flow rate of the fresh water from the reverse osmosis membrane;
   a third flowmeter which measures a third flow rate of high-concentration salt water, the high-concentration salt water being discharged when the filtered water is desalinated in the reverse osmosis membrane;
   a discharge valve which discharges the high-concentration salt water in accordance with a third control signal, the third control signal controlling a valve opening degree of the discharge valve;
   a control module which performs first flow rate control, second flow rate control, and third flow rate control, the first flow rate control generating the first control signal such that the first flow rate follows a sum of the second flow rate and the third flow rate and supplying the first control signal to the membrane filtering pump, the second flow rate control generating the second control signal such that the second flow rate follows a preset target value, and supplying the second control signal to the high-pressure pump, and the third flow rate control generating the third control signal such that the first pressure falls within a preset pressure range, and supplying the third control signal to the discharge valve;
   a control valve which outputs the filtered water, that is outputted from the filtering membrane and divided at a diverging point located before the high-pressure pump, in accordance with a fourth control signal, the fourth control signal controlling pressure of the divided filtered water by changing a valve opening degree of the control valve; and
   a power recovery device which increases the pressure of the filtered water from the control valve by using pressure of the high-concentration salt water, and outputs the filtered water, wherein a water feed pipe from the membrane filtering pump to the filtering membrane and a water feed pipe from the filtering membrane to the high-pressure pump function as header pipes and have a diameter that is larger than a diameter of a water feed pipe preceding the membrane filtering pump and a water feed pipe subsequent to the high-pressure pump.

2. The seawater desalination system of claim 1, further comprising:
a second pressure gauge which measures a second pressure of the filtered water from the control valve;
wherein the control module further performs pressure control of generating the fourth control signal such that the second pressure exceeds a preset lower limit pressure, and supplying the fourth control signal to the control valve.

3. A seawater desalination system comprising:
a membrane filtering pump which outputs seawater stored in a water obtaining vessel in accordance with a first control signal, the first control signal controlling flow rate of the seawater from the membrane filtering pump;
a first flowmeter which measures a first flow rate of the seawater from the membrane filtering pump;
a filtering membrane which filters the seawater from the membrane filtering pump;
a high-pressure pump which outputs filtered water, that is filtered by the filtering membrane, in accordance with a second control signal, the second control signal controlling a flow rate of the filtered water from the high-pressure pump;
a first pressure gauge which measures a first pressure of the filtered water from the high-pressure pump;
a reverse osmosis membrane which desalinates the filtered water from the high-pressure pump into fresh water
a second flowmeter which measures a second flow rate of the fresh water from the reverse osmosis membrane;
a third flowmeter which measures a third flow rate of high-concentration salt water, the high-concentration salt water being discharged when the filtered water is desalinated in the reverse osmosis membrane;
a discharge valve which discharges the high-concentration salt water in accordance with a third control signal, the third control signal controlling a valve opening degree of the discharge valve;
a control module which performs first flow rate control, second flow rate control, and third flow rate control, the first flow rate control generating the first control signal such that the first flow rate follows a sum of the second flow rate and the third flow rate and supplying the first control signal to the membrane filtering pump, the second flow rate control generating the second control signal such that the second flow rate follows a preset target value and supplying the second control signal to the high-pressure pump, and the third flow rate control generating the third control signal such that the first pressure falls within a preset pressure range and supplying the third control signal to the discharge valve;
a first shut-off valve which discharges the filtered water from the filtering membrane in accordance with a first instruction signal, the first instruction signal instructing the first shut-off valve to open and close;
a second shut-off valve which outputs the filtered water from the filtering membrane to the high-pressure pump in accordance with a second instruction signal, the second shut-off valve being provided in a water feed pipe that feeds the filtered water from the filtering membrane to the high-pressure pump, the second instruction signal instructing the second shut-off valve to open and close;
a third shut-off valve which discharges the filtered water from the water feed pipe in accordance with a third instruction signal, the third shut-off valve being provided upstream of the high-pressure pump in a following stage of the second shut-off valve, the third instruction signal instructing the third shut-off valve to open and close;
and a monitoring module which monitors occurrence of a trouble in a former-stage device including the filtering membrane and former modules, and occurrence of a trouble in a latter-stage device including the high-pressure pump and following modules, the control module performs first opening and closing control, second opening and closing control, and third opening and closing control, the first opening and closing control outputting the second instruction signal to open the second shut-off valve and outputting the first and the third instruction signals to close the first and the third shut-off valves if the former-stage device and the latter-stage device normally operate, the second opening and closing control outputting the first instruction signal to open the first shut-off valve and outputting the second and the third instruction signals to close the second and the third shut-off valves if the former-stage device normally operates and any trouble occurs in the latter-stage device, the third opening and closing control outputting the third instruction signal to open the third shut-off valve and outputting the first and the second instruction signals to close the first and the second shut-off valves if any trouble occurs in the former-stage device and the latter-stage device normally operates.

4. A seawater desalination system comprising:
a membrane filtering pump which outputs seawater stored in a water obtaining vessel in accordance with a first control signal, the first control signal controlling flow rate of the seawater from the membrane filtering pump;
a first flowmeter which measures a first flow rate of the seawater from the membrane filtering pump;
a filtering membrane which filters the seawater from the membrane filtering pump;
a high-pressure pump which outputs filtered water, that is filtered by the filtering membrane, in accordance with a second control signal, the second control signal controlling a flow rate of the filtered water from the high-pressure pump;
a first pressure gauge which measures a first pressure of the filtered water from the high-pressure pump;
a reverse osmosis membrane which desalinates the filtered water from the high-pressure pump into fresh water;
a second flowmeter which measures a second flow rate of the fresh water from the reverse osmosis membrane;
a third flowmeter which measures a third flow rate of high-concentration salt water, the high-concentration salt water being discharged when the filtered water is desalinated in the reverse osmosis membrane;
a discharge valve which discharges the high-concentration salt water in accordance with a third control signal, the third control signal controlling a valve opening degree of the discharge valve;
a control module which performs first flow rate control, second flow rate control, and third flow rate control, the first flow rate control generating the first control signal such that the first flow rate follows a sum of the second flow rate and the third flow rate and supplying the first control signal to the membrane filtering pump, the second flow rate control generating the second control signal such that the second flow rate follows a preset target value and supplying the second control signal to the high-pressure pump, and the third flow rate control generating the third control signal such that the first pressure falls within a preset pressure range and supplying the third control signal to the discharge valve;

a control valve which outputs the filtered water, that is outputted from the filtering membrane and divided at a diverging point located before the high-pressure pump, in accordance with a fourth control signal, the fourth control signal controlling pressure of the divided filtered water by changing a valve opening degree of the control valve;

a second pressure gauge which measures a second pressure of the filtered water from the control valve;

a power recovery device which increases the pressure of the filtered water from the control valve by using pressure of the high-concentration salt water, and outputs the filtered water;

a first shut-off valve which discharges the filtered water from the filtering membrane in accordance with a first instruction signal, the first instruction signal instructing the first shut-off valve to open and close;

a second shut-off valve which outputs the filtered water from the filtering membrane to the high-pressure pump in accordance with a second instruction signal, the second shut-off valve being provided before the diverging point in a water feed pipe that feeds the filtered water from the filtering membrane to the high-pressure pump, the second instruction signal instructing the second shut-off valve to open and close;

a third shut-off valve which discharges the filtered water from the water feed pipe in accordance with a third instruction signal, the third shut-off valve being provided between the second shut-off valve and the diverging point, the third instruction signal instructing the third shut-off valve to open and close; and a monitoring module which monitors occurrence of a trouble in a former-stage device including the filtering membrane and former modules, and occurrence of a trouble in a latter-stage device including the high-pressure pump and following modules, the control module performs pressure control, the pressure control outputting the fourth control signal to the control valve such that the second pressure exceeds a preset lower limit pressure, the control module performs first opening and closing control, second opening and closing control, and third opening and closing control, the first opening and closing control outputting the second instruction signal to open the second shut-off valve and outputting the first and the third instruction signals to close the first and the third shut-off valves if the former-stage device and the latter-stage device normally operate, the second opening and closing control outputting the first instruction signal to open the first shut-off valve and outputting the second and the third instruction signals to close the second and the third shut-off valves if the former-stage device normally operates and any trouble occurs in the latter-stage device, the third opening and closing control outputting the third instruction signal to open the third shut-off valve and outputting the first and the second instruction signals to close the first and the second shut-off valves if any trouble occurs in the former-stage device and the latter-stage device normally operates.

5. The seawater desalination system according to claim 3, wherein a water feed pipe from the membrane filtering pump to the filtering membrane and a water feed pipe from the filtering membrane to the high-pressure pump function as header pipes and have a diameter that is larger than a diameter of a water feed pipe preceding the membrane filtering pump and a water feed pipe subsequent to the high-pressure pump.

6. The seawater desalination system according to claim 4, wherein a water feed pipe from the membrane filtering pump to the filtering membrane and a water feed pipe from the filtering membrane to the high-pressure pump function as header pipes and have a diameter that is larger than a diameter of a water feed pipe preceding the membrane filtering pump and a water feed pipe subsequent to the high-pressure pump.

7. The seawater desalination system according to claim 4, comprising a plurality of filtering membranes in parallel.

8. The seawater desalination system according to claim 5, comprising a plurality of filtering membranes in parallel.

9. The seawater desalination system according to claim 6, comprising a plurality of filtering membranes in parallel.

* * * * *

UNITED STATES PATENT AND TRADEMARK OFFICE
CERTIFICATE OF CORRECTION

PATENT NO. : 8,834,712 B2
APPLICATION NO. : 13/013241
DATED : September 16, 2014
INVENTOR(S) : Katayama et al.

It is certified that error appears in the above-identified patent and that said Letters Patent is hereby corrected as shown below:

In the Claims

Claim 3, column 11, line 35, change "water" (second occurrence) to --water;--.

Signed and Sealed this
Third Day of February, 2015

Michelle K. Lee
*Deputy Director of the United States Patent and Trademark Office*